United States Patent [19]

Mohri et al.

[11] Patent Number: 5,021,970

[45] Date of Patent: Jun. 4, 1991

[54] METHOD AND APPARATUS FOR GENERATING AND APPLYING COMMON TEACHING DATA OF ROBOTS

[75] Inventors: Shunji Mohri, Yokohama; Akira Ashida, Tokyo, both of Japan

[73] Assignee: Hitachi, Ltd., Tokyo, Japan

[21] Appl. No.: 253,154

[22] Filed: Oct. 4, 1988

[30] Foreign Application Priority Data

Oct. 5, 1987 [JP] Japan .................. 62-249962

[51] Int. Cl.$^5$ .................................. G06F 15/00
[52] U.S. Cl. .................................. 364/513; 901/8
[58] Field of Search .................. 364/513, 191–193, 364/474.35; 901/6–8; 318/632, 568

[56] References Cited

U.S. PATENT DOCUMENTS

| | | | |
|---|---|---|---|
| 4,590,578 | 5/1986 | Barto, Jr. et al. | 364/513 |
| 4,594,670 | 6/1986 | Itoh | 364/513 |
| 4,613,943 | 9/1986 | Miyake et al. | 364/191 |
| 4,670,849 | 6/1987 | Okada et al. | 364/513 |
| 4,683,544 | 7/1987 | Hariki | 364/191 |
| 4,712,183 | 12/1987 | Shinoshita et al. | 901/8 |
| 4,722,063 | 1/1988 | Yasukawa et al. | 364/513 |
| 4,725,965 | 2/1988 | Keenan | 364/513 |
| 4,761,745 | 8/1988 | Kodaira | 364/192 |
| 4,817,017 | 3/1989 | Kato | 901/7 |

FOREIGN PATENT DOCUMENTS 61-74007 8/1986 Japan .
61-136102 11/1986 Japan .

OTHER PUBLICATIONS

Richard P. Paul, "Robot Manipulators: Mathematics Programming and Control", the MIT Press, Bulletin of JSME, vol. 28, No. 244 (1985).

Primary Examiner—Allen R. MacDonald
Attorney, Agent, or Firm—Kenyon & Kenyon

[57] ABSTRACT

In a robot having a servo control section for driving an actuator, an arithmetic operating unit, memories, and input and output devices, a method and apparatus provide teaching data from one robot to another. First, there is detection of mechanism errors peculiar to a particular robot of interest. Standard position information obtained from the result of a teaching operation and compensation of the mechanism errors of another robot is used with the mechanism errors of the particular robot to calculate the corrected standard position information (teaching data for the particular robot). This information is derived by subtracting the mechansim errors of the particular robot from that standard position information to produce the teaching data for the particular robot.

13 Claims, 10 Drawing Sheets

FIG. 5A $\vec{h} = \vec{f} \times \vec{g}$

ROBOT HAND COORDINATES SYSTEM EXPRESSION

EULERIAN ANGLES $(\phi, \theta, \psi)$

FIG. 6

STORAGE FORMAT OF TEACHING POINTS

| POINT NAME | x | y | z | fx | fy | fz | gx | gy | gz | θ₁ | | θn |
|---|---|---|---|---|---|---|---|---|---|---|---|---|
| P001 | 10.0 | 5.0 | 8.0 | 1.0 | 0.0 | 0.0 | 0.0 | 1.0 | 0.0 | 24.4 | | 39.5 |
| ... | | | | | | | | | | | | |

FIG. 7

MOVING OPERATION AMONG A PLURALITY OF POINTS

FIG. 8

ERROR PARAMETER

| n | $\Delta P_{01}$ | $\Delta P_{02}$ | ---- | $\Delta P_{06}$ | $\Delta P_{11}$ | $\Delta P_{12}$ | ---- | $\Delta P_{16}$ | $\Delta P_{n1}$ | ---- | $\Delta P_{n6}$ |

(DEGREE OF FREEDOM)

FIG. 9

METHOD OF OBTAINING $\vec{X}(\vec{P}+\Delta\vec{P})$

FIG. 10

$\vec{X}(\vec{P}+\Delta\vec{P})$ OF THE ROBOT OF 2-DEGREE OF FREEDOM

METHOD AND APPARATUS FOR GENERATING AND APPLYING COMMON TEACHING DATA OF ROBOTS

BACKGROUND OF THE INVENTION

The present invention relates to generation and utilization of teaching data of a robot and, more particularly, to a method and apparatus for generating and applying teaching data whereby teaching data of one robot can be commonly used for another robot.

Figure 3A:
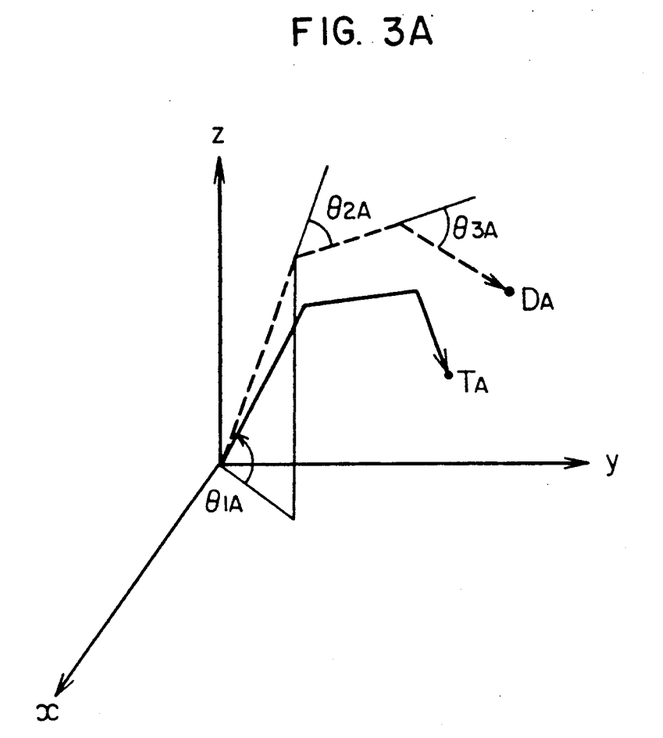
FIGS. 3A and 3B are diagrams showing the coordinates systems of robots A and B, respectively.

A servo command value for a robot is frequently indicated by joint angles, e.g. $\theta_{1A}$, $\theta_{2A}$ shown in FIG. 3A. There is a relation of $$\vec{X}(\vec{P})$$

between joint angles and a command position $D_A$ by a mechanism parameter P including the angle $\theta_{2A}$. $\vec{X}$ denotes a vector indicative of the position and orientation of a robot. $\vec{P}$ is a mechanism parameter indicative of the length of arm, attaching angle, or the like.

Figure 4A:
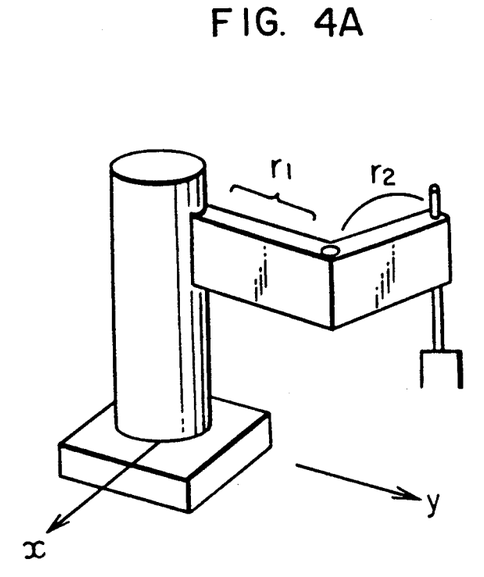
FIGS. 4A and 4B are a diagram showing an example of a biaxial SCARA robot and a diagram showing a coordinates system expression, respectively.
Figure 4B:
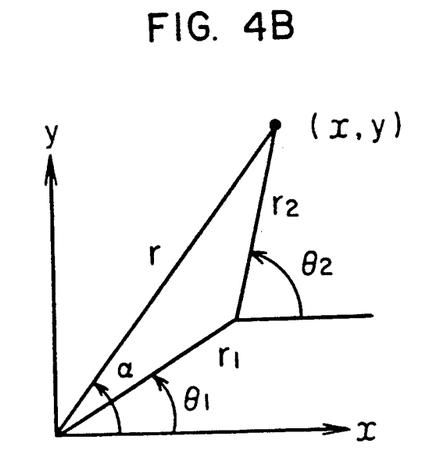

When considering a 2 degree-freedom SCARA robot shown in, e.g., FIG. 4A, the command values are $\theta_1$ and $\theta_2$ in FIG. 4B. (Although the definitions of the $\theta_1$ and $\theta_2$ differ in every robot, they are defined as shown in FIG. 4B in this example). Only arm lengths $r_1$ and $r_2$ are provided as mechanism parameters. Consequently, the following equation is derived.

$$\vec{X}(\vec{P}) = \begin{pmatrix} x(r_1, r_2) \\ y(r_1, r_2) \end{pmatrix} = \begin{pmatrix} r_1\cos\theta_1 + r_2\cos\theta_2 \\ r_1\sin\theta_1 + r_2\sin\theta_2 \end{pmatrix} \quad (1)$$

On the contrary, joint angles can be also obtained from $\vec{X}(\vec{P})$ by the well-known coordinates transformation of a robot.

For instance, in the case of FIGS. 4A and 4B, assuming that $$\tan\alpha = \frac{y}{x}$$

(when $x = 0$, $\alpha = 90°$)

$$r = \sqrt{x^2 + y^2}$$

$\theta_1$ and $\theta_2$ can be obtained by $$\cos(\theta_1 - \alpha) = \frac{r^2 + r_1^2 - r_2^2}{2r \cdot r_1} \quad (2)$$

$$\tan(\theta_2 - \alpha) = \frac{-r_1\sin(\theta_1 - \alpha)}{r - r_1\cos(\theta_1 - \alpha)}$$

However, since the mechanism parameter $\vec{P}$ includes the assembling error and the machining error of the dimensions and angle $\Delta\vec{P}$ (which is referred to as the mechanism errors) which occur upon working, even if the robot is operated in accordance with a command value, the robot does not reach the command position $D_A$ but actually moves to a position $T_A$.

For example, when the arm lengths $r_1$ and $r_2$ of the robot shown in FIG. 4A include errors of $\Delta r_1$ and $\Delta r_2$, if $\theta_1$ and $\theta_2$ are given, the robot does not reach the position $D_A$ $$D_A = \begin{pmatrix} x \\ y \end{pmatrix} = \begin{pmatrix} r_1\cos\theta_1 + r_2\cos\theta_2 \\ r_1\sin\theta_1 + r_2\sin\theta_2 \end{pmatrix} \quad (3)$$

but it obviously moves to the position $T_A$ $$T_A = \begin{pmatrix} x' \\ y' \end{pmatrix} = \begin{pmatrix} (r_1 + \Delta r_1)\cos\theta_1 + (r_2 + \Delta r_2)\cos\theta_2 \\ (r_1 + \Delta r_1)\sin\theta_1 + (r_2 + \Delta r_2)\sin\theta_2 \end{pmatrix} \quad (4)$$

Further, if the origin positions (the positions when $\theta = 0$) of $\theta_1$ and $\theta_2$ are deviated by $\Delta\theta_1$ and $\Delta\theta_2$, the equation (4) becomes as follows.

$$T_A = \begin{pmatrix} x' \\ y' \end{pmatrix} =$$

$$\begin{pmatrix} (r_1 + \Delta r_1)\cos(\theta_1 + \Delta\theta_1) + (r_2 + \Delta r_2)\cos(\theta_2 + \Delta\theta_2) \\ (r_1 + \Delta r_1)\sin(\theta_1 + \Delta\theta_1) + (r_2 + \Delta r_2)\sin(\theta_2 + \Delta\theta_2) \end{pmatrix} \quad (5)$$

That is, even if the robot is desired to move to the position $D_A$ of the equation (3) by using ($r_1$, $r_2$, $\theta_1$, $\theta_1$), the robot arrives at the position $T_A$ of the equation (5) due to ($\Delta r_1$, $\Delta r_2$, $\Delta\theta_1$, $\Delta\theta_2$).

In other words, when the robot is controlled by the command position $D_A = \vec{X}(\vec{P})$, the robot eventually reaches the position $T_A = \vec{X}(\vec{P} + \Delta\vec{P})$. Therefore, the operator performs a teaching work for allowing the robot to be positioned to the actual position $T_A$, and the command position $\vec{X}(\vec{P})$ is stored as teaching data into a memory, and playback processes are executed on the basis of this teaching data.

A method of obtaining the mechanism error $\Delta\vec{P}$ has been disclosed in U.S. Pat. No. 4,670,849 by Okada et al, filed on June 2, 1987. On the other hand, a method of obtaining what is called a coordinates transformation equations corresponding to the equations (1) and (2) suitable for general robots such as robots other than the SCARA robot has been disclosed in detail in Richard P. Paul, "Robot Manipurators: Mathematics, Programming and Control", The MIT Press.

In the case of using a plurality of robots of the same type, there is a large demand such that the data taught to one of the robots is used even for the other robots. However, since the mechanism error $\Delta\vec{P}$ of the robot as mentioned above differs in each robot, the data taught to one robot cannot be directly used for the other robots. Therefore, hitherto, when the teaching data is implanted to the other robots, the complicated adjustments of the positioning points are executed by using a teaching box after the teaching data was implanted. Namely, hitherto, the teaching data cannot be mutually used by the other robots.

SUMMARY OF THE INVENTION

It is an object of the present invention to provide a method and apparatus for generating and utilizing teaching data whereby teaching data are commonly usable among a plurality of robots.

Another object of the invention is to provide a robot control unit which is able to use another robot's teaching data without adjusting it manually.

The above object is accomplished by presuming the mechanism errors of individual robots and by making standard position information from which the mechanism errors were eliminated as teaching data.

Generation of the standard position information from which the mechanism errors were eliminated has the following meanings. That is, the current position of a robot in the robot coordinate system assumes X(P). X denotes the position and orientation of the robot and P represents the mechanism parameter (arm length, attaching angle, etc.).

Figure 5A:
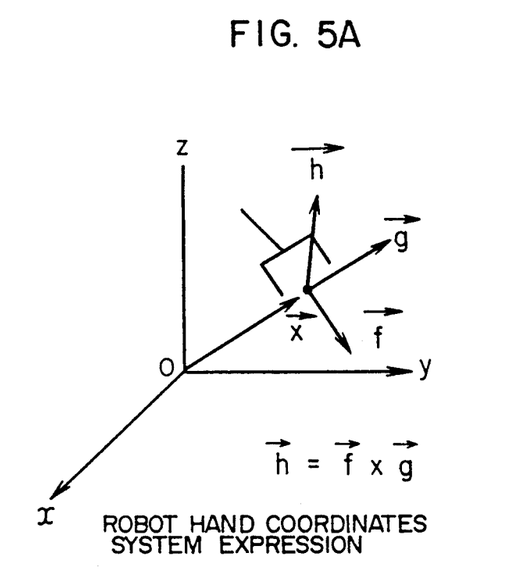
FIGS. 5A to 5C are a diagram showing a robot hand coordinates system expression, an explanatory diagram of an Eulerian angle, and an explanatory diagram of a roll pitch yaw, respectively.
Figure 5B:
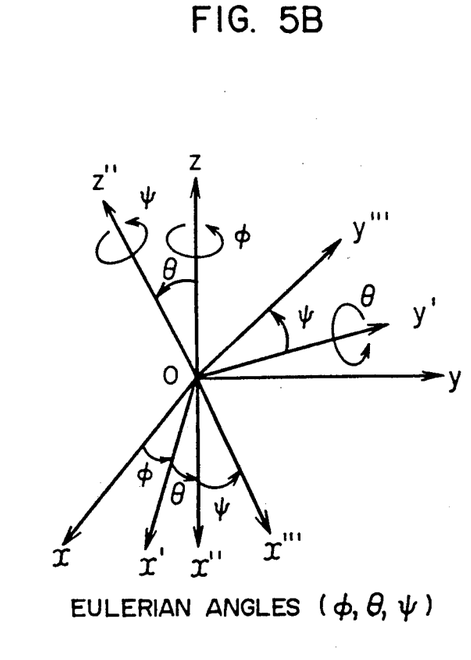
Figure 5C:
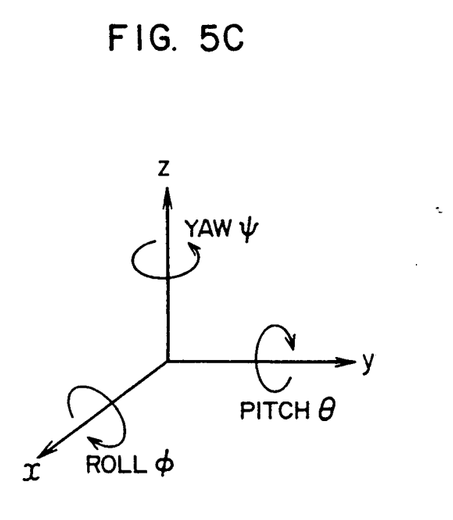

The state of a robot in the space can be represented by six independent data of the position coordinates of the robot hand and the orientation thereof. It is sufficient that the position coordinates are set to three points (x, y, z) in a three-dimensional space. The orientation can be represented by various expressing methods. Typical examples of the expressing methods are shown in FIGS. 5A to 5C. (Refer to the foregoing literature of R. Paul.)

The method of FIG. 5A is called a robot hand coordinates system expression. The method of FIG. 5B is called an Eulerian angle expression. The method of FIG. 5C is called a roll pitch yaw expression. In the cases of the Eulerian angle and the roll pitch yaw, three independent data are used. In the case of the robot hand coordinates system, three vectors $\vec{f}$, $\vec{g}$, and $\vec{h}$ are used. However, since $$\vec{h} = \vec{f} \times \vec{g}$$

there is no need to store $\vec{h}$. Since $\vec{f}$ and $\vec{g}$ between the remaining two vectors f and g (the number of components is six) are the direction cosine, its length is set to 1. That is, $$|\vec{f}| = \sqrt{f_x^2 + f_y^2 + f_z^2} = 1$$

($f_i$ is a component of the vector $\vec{f}$)

$$|\vec{g}| = \sqrt{g_x^2 + g_y^2 + g_z^2} = 1$$

Therefore, since either one of ($f_x$, $f_y$, $f_z$) or either one of ($g_x$, $g_y$, $g_z$) is expressed by the other components, it is also unnecessary to store it.

For instance, since $f_z^2 = 1 - f_x^2 - f_y^2$, $f_z$ can be omitted. On the other hand, since $\vec{f}$ and $\vec{g}$ cross perpendicularly, the inner product is 1. That is, $$\vec{f} \cdot \vec{g} = f_x g_x + f_y g_y + f_z g_z = 1$$

From this equation, another component becomes unnecessary. For example, $g_y$ can be completely expressed by the other components $f_x$, $g_x$ and $f_y$. Therefore, in the case of the robot hand coordinates system, even if there are three vectors (the number of components is 9), the number of independent components among them is still three. For instance, it is sufficient to have the data of only $f_x$, $f_y$ and $g_x$. However, actually, six data of $\vec{f}$ and $\vec{g}$ are provided as redundancy data for convenience of the calculations.

The current position after the teaching operation is expressed as $\vec{X}(\vec{P} + \Delta\vec{P})$ in the absolute coordinates system in which the installing position of the robot is set to an origin. $\Delta P$ denotes an error of the mechanism parameter.

Figures 15, 16:
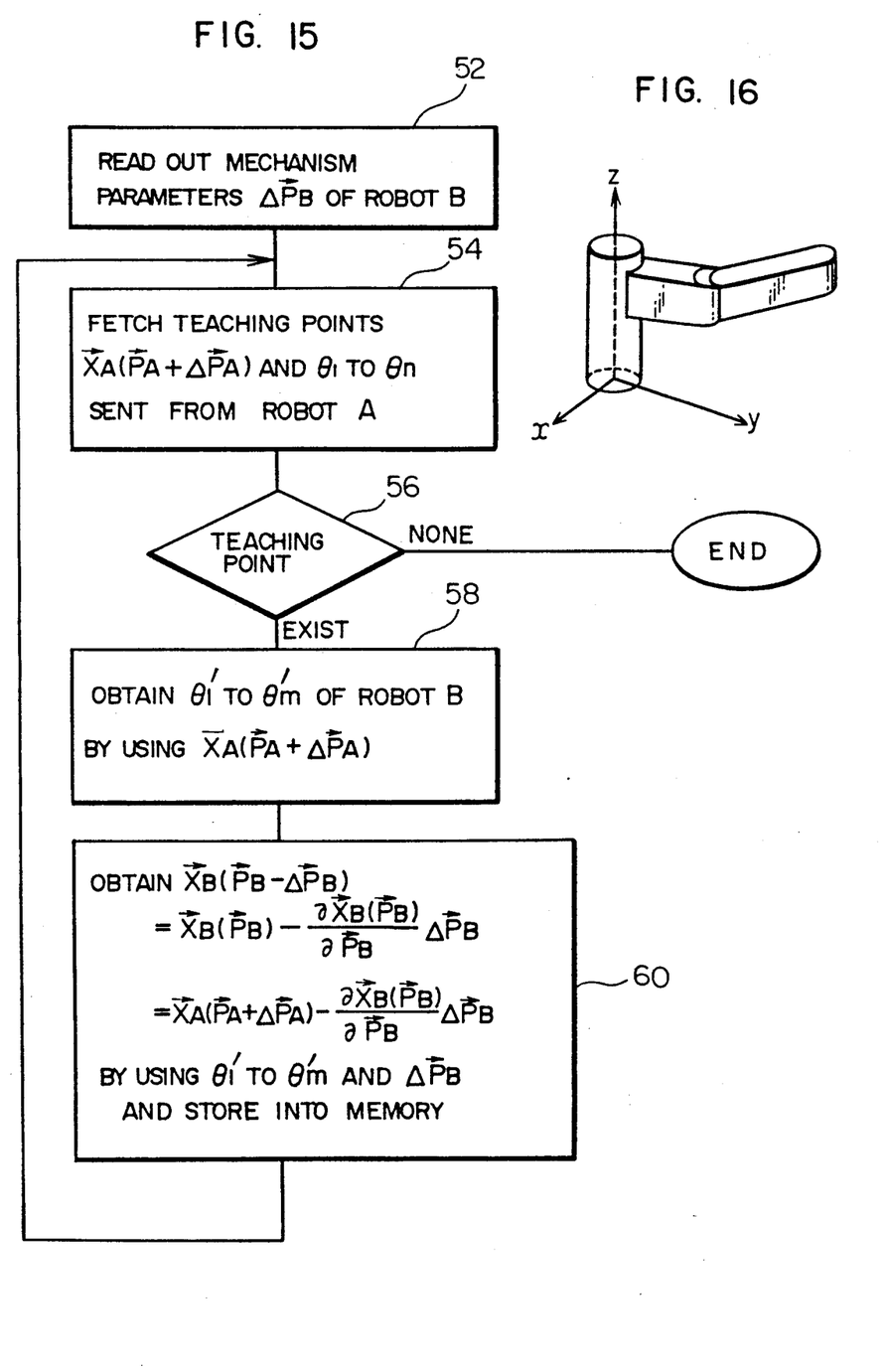
FIG. 15 is a flowchart for explaining the processes in another embodiment according to the invention.
FIG. 16 is an explanatory diagram of the absolute coordinates system.

The robot coordinates system and absolute coordinates system will now be described. First, absolute coordinates system is the ordinary xyz coordinates system in which the installing position of the robot is set to an origin as mentioned above. Although the definitions of x, y and z differ in dependence on the respective robot manufacturers, they are defined as shown in FIG. 16 in this embodiment.

On the other hand, the robot coordinates system relates to a space which is drawn by each articulated angle (in the case of a mechanism having a joint which translates, a translational distance thereof) to control the robot. For instance, in the case of the robot shown in FIG. 4B, the robot coordinates system corresponds to a two-dimensional plane in which $\theta_1$ and $\theta_2$ are set to axes. The points ($\theta_1$, $\theta_2$) (which are equal to $\vec{X}(\vec{P})$) in the robot coordinates system are set to $\vec{X}(\vec{P} + \Delta\vec{P})$ in the case of the absolute coordinates system.

That is, if the current position of a robot is $\vec{X}(\vec{P} + \Delta\vec{P})$ in the absolute coordinates system, the command values to the robot is actually the value $\vec{X}(\vec{P})$ in the robot coordinates system. In other words, the robot moves to the position of $\vec{X}(\vec{P} + \Delta\vec{P})$ due to the mechanism errors when the robot is controlled so as to move to the position of the command value $\vec{X}(\vec{P})$. No problem occurs so long as teaching data is given and executed by using the same robot. However, when the command value (teaching data) $\vec{X}(\vec{P})$ is transferred to the other robot and executed, this robot moves to the position of $\vec{X}(\vec{P} + \Delta\vec{P}_B)$ because the mechanism errors $\Delta\vec{P}_B$ differ. Therefore, the standard position information $\vec{X}(\vec{P} + \Delta\vec{P})$ is previously made from the command value X(P) by using the known mechanism errors $\Delta\vec{P}$ and the command value for positioning is made on the basis of the standard position information. Due to this, the teaching data can be efficiently mutually used.

DETAILED DESCRIPTION OF THE PRESENT INVENTION

An embodiment of the present invention will be described hereinbelow with reference to the drawings.

Figure 1:
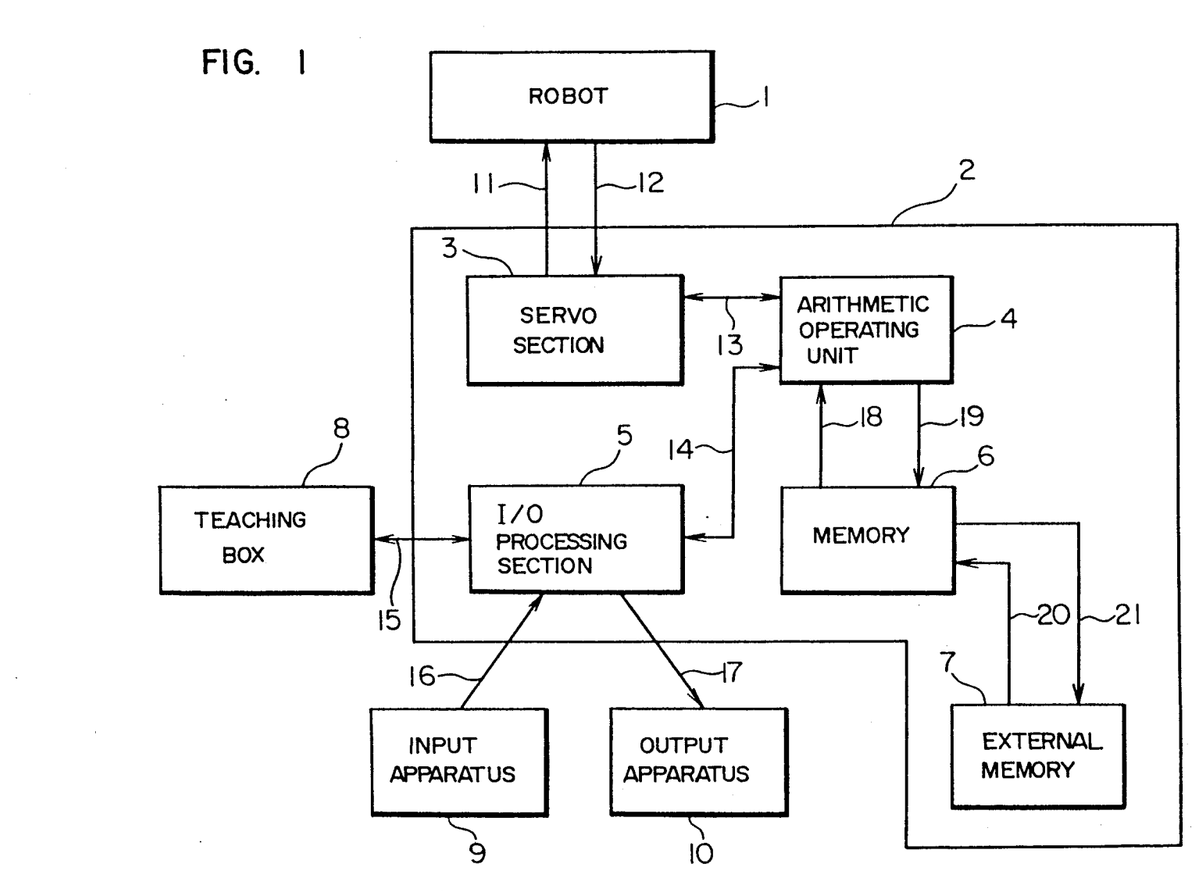
FIG. 1 is a block diagram of a control unit for a robot to which a teaching data generating method according to an embodiment of the present invention is applied.

FIG. 1 is a block diagram of a control unit for a robot. Reference numeral 1 denotes a robot and 2 indicates a control unit for the robot. The control unit 2 comprises: a servo section 3; an arithmetic operating unit 4; an input/output (I/O) processing section 5; an internal memory 6; and an external memory 7 to store teaching data. A teaching pendant 8 to input the teaching operation, an input apparatus 9 to input commands, and an output apparatus 10 are connected to the control unit 2. Arrows 11 to 21 show flows of information among the respective components and represent a command value 11 to an actuator of the robot from the servo section 3, a status signal 12 of the actuator, a signal 13 indicative of a servo command and a servo status, input/output (I/O) information 14, I/O information 15 to the teaching pendant 8, input information 16 from the input apparatus 9, output information 17 to the output apparatus 10, I/O data 18 and 19 of teaching data from/into the internal memory 6, and I/O data 20 and 21 of the teaching data from/into the external memory 7.

The control by the teaching playback of the robot is executed in the following steps.

(a) The robot is positioned at a desired position in the space, at a certain orientation, by pressing buttons (for instance, X+ denotes that the robot is moved in the + direction on the x axis but not shown) on the teaching pendant 8.

(b) To take in the command values $\vec{X}(\vec{P})$ of the position and orientation, the button to "take in the teaching points" (not shown) on the teaching pendant is pressed.

(c) The arithmetic operating unit 4 performs the following operation for those processes.

(i) The status 12 of the actuator is taken in (the status includes the data regarding the current position of each actuator).

Figure 3B:
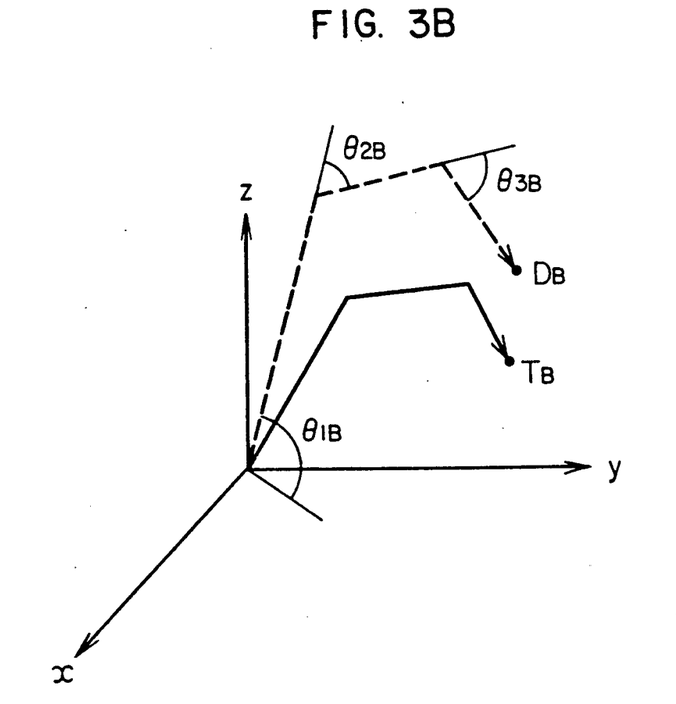

(ii) Each of the articulated angles ($\theta_1$ to $\theta_n$ in FIG. 3) of the robot is obtained from the data regarding the current position of each actuator.

(iii) The position (x, y, z) and orientation $(\vec{f}, \vec{g})$ of the robot hand are obtained from the respective articulated angles.

Figure 6:
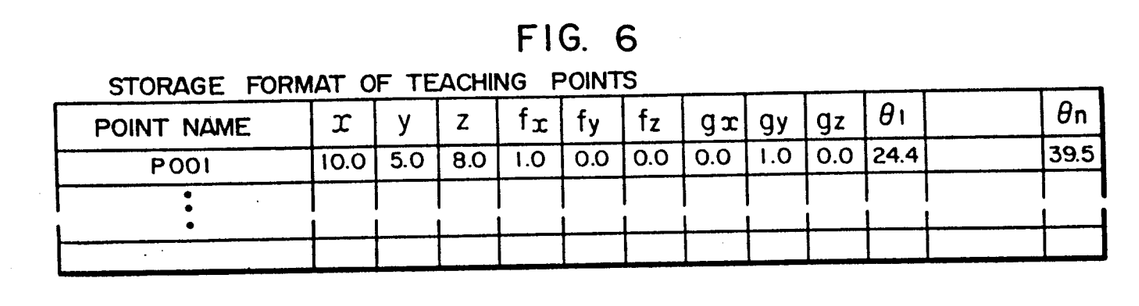
FIG. 6 is a diagram showing an example of a storage format of teaching points.

(iv) The position and orientation data obtained are stored in the external memory 7. At this time, a storage format is as shown in FIG. 6. The orientation can be also expressed as shown in FIG. 5B or 5C without limiting to $(\vec{f}, \vec{g})$. On the other hand, the articulated angles $\theta_1$ to $\theta_n$ in the step (ii) may be also together provided (as shown in an example of FIG. 6). Or only the articulated angles can be also stored. Even if those data were stored, they can be mutually converted and they can be said to be all equivalent for purposes of this operation.

Figure 7:
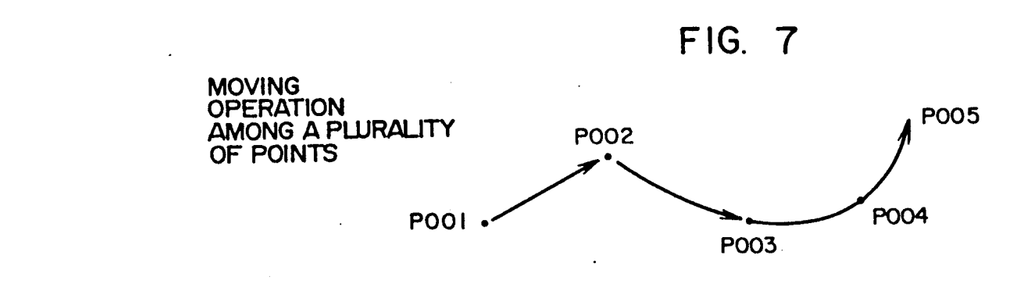
FIG. 7 is an explanatory diagram of the moving operation among a plurality of points.

(d) A plurality of teaching points are set to positioning points and such a playback operation as to connect these points is executed. This operating process has been described in detail, for example, in the fifth chapter, 6th to 9th paragraphs, of the book by R. Paul.

Figure 2:
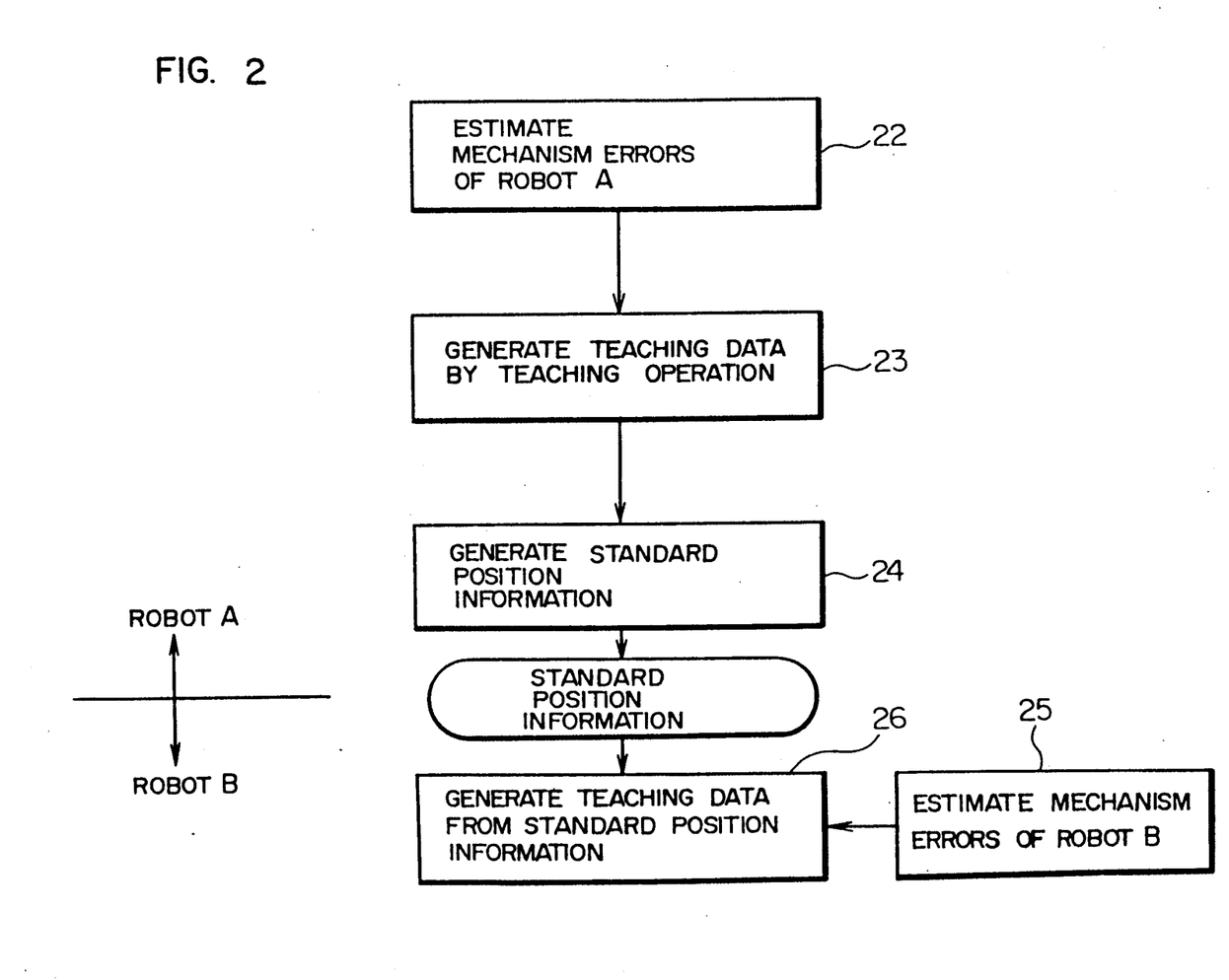
FIG. 2 is a flowchart showing a procedure of the teaching data generating method according to the embodiment of the invention.

FIG. 2 is a flowchart showing a procedure of a teaching data generating method according to the present invention and shows the case where teaching data of the robot B is made from teaching data of the robot A. In this embodiment, the teaching data is made in five steps comprising: a step 22 of estimating the mechanism errors of the robot A; a step 23 of generating teaching data; a step 24 of generating the standard position information; a step 25 of estimating the mechanism errors of the robot B; and a step 26 of generating teaching data of the robot B from the standard position information of the robot A.

Figure 8:
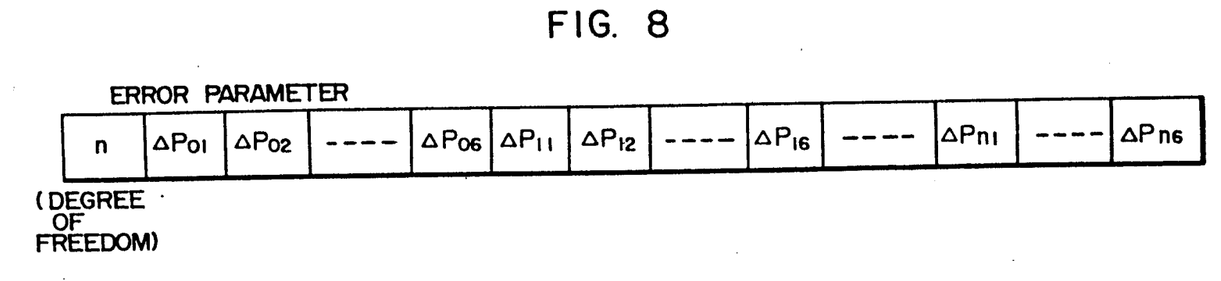
FIG. 8 is a format diagram of error parameters.

In the steps 22 and 25 of estimating the mechanism errors, the mechanism errors of the robots are estimated. As a method of obtaining the mechanism errors (also including the installation errors of the robots in more detail) $\Delta \vec{P}$, the method described in, e.g., Okada et al, U.S. Patent mentioned above can be also used. After the mechanism errors were once obtained, they are not changed so long as the robot is not moved to the other place or struck with obstacles. Therefore, they are stored in the external memory 7 in a format as shown in FIG. 8. The mechanism errors relate to the errors of the parts of the robot and the degree of freedom of the part in the space is six, so that each part has six parameters. Therefore, in the case of the robot whose degree of freedom is n, at most 6n error parameters exist. Further, when the installation errors are also included in those parameters, 6(n+1) parameters exist.

In the next step 23, the teaching data is made. This step 23 relates to the teaching operation. In this step, the robot A is moved to a desired position by using the teaching pendant 8, the current position of the robot is obtained from the status 12 including the encoder value from the robot, and the current position obtained is stored into the internal memory 6 or external memory 7. The details of these processes are as mentioned above.

The robot A has only the teaching data of the command position $\vec{X}(\vec{P})$. However, the position and orientation at which the operator wants to actually position the robot are the position $\vec{X}(\vec{P}+\Delta\vec{P})$ in the absolute coordinates system. Therefore, in step 24, the position $\vec{X}(\vec{P}+\Delta\vec{P})$ is obtained from the command position $\vec{X}(\vec{P})$ by using the mechanism parameter errors $\Delta\vec{P}$ obtained in step 22.

Figure 9:
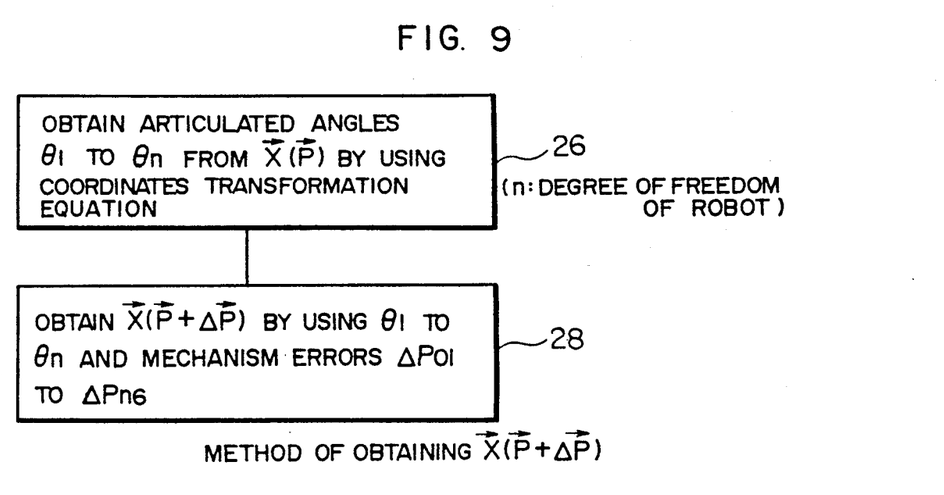
FIG. 9 is a flowchart for explaining a method of obtaining the current position of a robot.

The details of the method are as shown in FIG. 9.

In the case of explaining the method as an example in the robot shown in FIG. 4, it is assumed that $$\vec{X}(\vec{P}) = \begin{pmatrix} x \\ y \end{pmatrix}$$

$$\Delta\vec{P} = (\Delta r_1, \Delta r_2, \Delta\theta_1, \Delta\theta_2)$$

Figure 10:
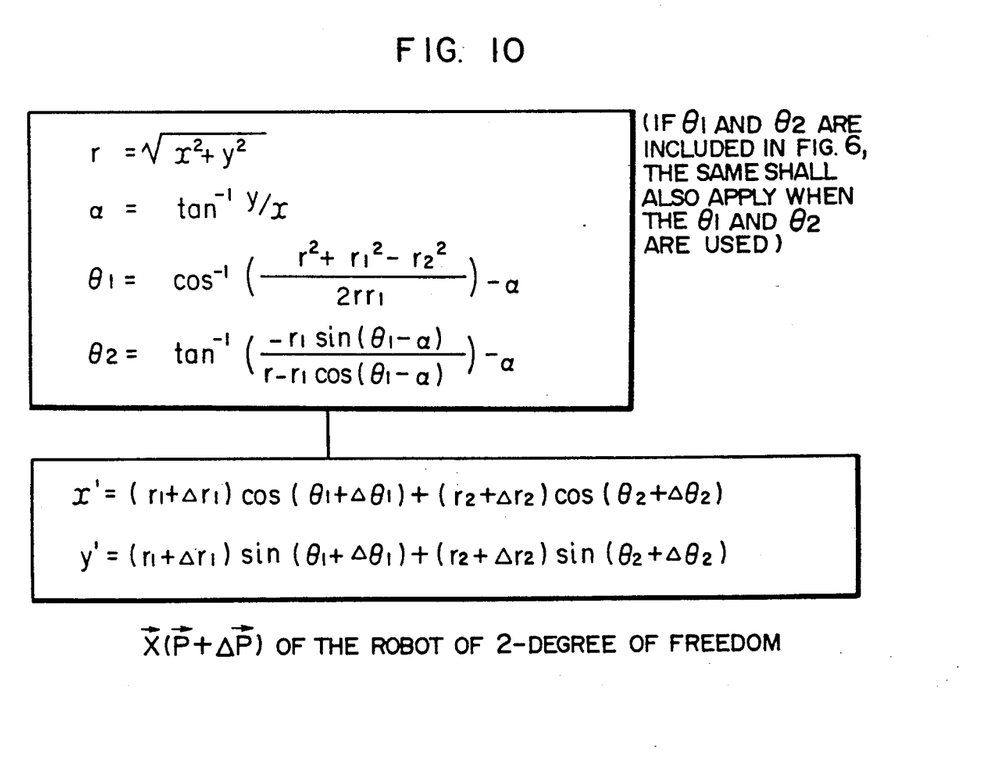
FIG. 10 is a diagram showing a method of obtaining the current position of a robot whose degree of freedom is two.

(limited to only the errors in the plane) have already been given, and the $\vec{X}(\vec{P}+\Delta\vec{P})$ is derived as shown in FIG. 10 by using the equation (2) and (5). The $\vec{X}(\vec{P}+\Delta\vec{P})$ indicates the actual position of the robot A in the space when it is controlled by using the command values $\vec{X}(\vec{P})$.

Consequently, $\vec{X}(\vec{P}+\Delta\vec{P})$ is the position to which the robot B is to be actually moved. The $\vec{X}(\vec{P}+\Delta\vec{P})$ can be said to be the standard position information when the teaching data is mutually used among the robots.

In step 26, the teaching data of the robot B is obtained by the standard position information. In order to actually move both of the robots A and B to the same position, the standard position information also corresponds to the values $T_B = \vec{Y}(\vec{P} + \Delta \vec{P}_B)$ $(= \vec{X}(\vec{P} + \Delta \vec{P}))$ of the positioning points of the robot B in the absolute coordinates system (FIG. 3B). $\Delta \vec{P}_B$ indicates the mechanism errors of the robot B. $\vec{Y}$ denotes a vector indicative of the position and orientation of the robot B. The practical functional form of $\vec{Y}$ is the same as that of $\vec{X}$ if the robots A and B have the same mechanism. $\vec{Y}(\vec{P})$ is obtained from the $\vec{Y}(\vec{P} + \Delta \vec{P}_B)$ and the robot B is moved by using the Y(P) as the command position. Thus, the robot B can be positioned to the position $\vec{Y}(\vec{P} + \Delta \vec{P}_B)$, that is, to the positioning point $\vec{X}(\vec{P} + \Delta \vec{P})$ of the robot A. In this manner, the teaching data can be mutually used.

The $\vec{Y}(\vec{P})$ can be obtained from the position $\vec{Y}(\vec{P} + \Delta \vec{P}_B)$ to which the robot B is to be moved by performing the arithmetic operations (namely, the process to subtracting the mechanism errors $\Delta \vec{P}_B$) opposite to those in step 24.

In other words, a situation such that the robot moves to the position $\vec{X}(\vec{P} + \Delta \vec{P})$ in spite of the instruction of the command value $\vec{X}(\vec{P})$ means that the mechanism errors $\Delta \vec{P}$ are cancelled and the robot moves to the position $\vec{X}(\vec{P})$ on the basis of the instruction of the command value $\vec{X}(\vec{P} + \Delta \vec{P})$. By use of this meaning, it can be said that the command value to position the robot to the position $\vec{Y}(\vec{P})$ is $\vec{Y}(\vec{P} + \Delta \vec{P}_B)$.

Since $\vec{Y}(\vec{P})$ is equal to $\vec{X}(\vec{P} + \Delta \vec{P})$, when using the same arithmetic operating equations as those in step 24, the command position $D_B$ can be obtained by $$\vec{Y}(\vec{P}) = \vec{X}(\vec{P} + \Delta \vec{P} + \Delta \vec{P}_B) \quad (6)$$

because it is sufficient to eliminate the influence by $\Delta \vec{P}_B$. The right side of the equation (6) can be approximated as follows.

$$\vec{X}(\vec{P} + \Delta \vec{P} - \Delta \vec{P}_B) \approx \vec{X}(\vec{P} + \Delta \vec{P}) - \Sigma \frac{\partial \vec{X}(\vec{P} + \Delta \vec{P})}{\partial \vec{P}} \cdot \Delta \vec{P}_B \quad (7)$$

Now, since $$\vec{X}(\vec{P} + \Delta \vec{P}) \approx \vec{X}(\vec{P}) + \frac{\partial \vec{X}(\vec{P})}{\partial \vec{P}} \Delta \vec{P}$$

this equation can be modified as follows.

$$\frac{\partial \vec{X}(\vec{P} + \Delta \vec{P})}{\partial \vec{P}} \approx \frac{\partial \vec{X}(\vec{P})}{\partial \vec{P}} + \frac{\partial^2 \vec{X}(\vec{P})}{\partial \vec{P}^2} \Delta \vec{P}$$

By substituting this equation to the equation (7), we have $$\vec{X}(\vec{P} + \Delta \vec{P} - \Delta \vec{P}_B) \approx \vec{X}(\vec{P} + \Delta \vec{P}) -$$

$$\left( \frac{\partial \vec{X}(\vec{P})}{\partial \vec{P}} + \frac{\partial^2 \vec{X}(\vec{P})}{\partial \vec{P}^2} \Delta \vec{P} \right) \Delta \vec{P}_B.$$

Since the mechanism errors $\Delta \vec{P}$ and $\Delta \vec{P}_B$ are small, their product is further small. By ignoring this product, $\vec{X}(\vec{P} + \Delta \vec{P} + \Delta \vec{P}_B)$ can be also obtained. At this time, $$\vec{X}(\vec{P} + \Delta \vec{P} + \Delta \vec{P}_B) \approx \vec{X}(\vec{P} + \Delta \vec{P}) - \frac{\partial \vec{X}(\vec{P})}{\partial \vec{P}} \Delta \vec{P}_B$$

Now, $\frac{\partial \vec{X}}{\partial \vec{Y}} \Delta \vec{P}$ means $$\sum_{i=1}^{6(n+1)} \frac{\partial X_i(\vec{P})}{\partial P_i} \Delta P_i$$

(where $X_i$, $P_i$, $\Delta P_i$ are the i-th components of the vectors $\vec{X}$, $\vec{P}$, and $\Delta \vec{P}$.)

Since each $X_i(\vec{P})$ has already been known as shown in the equation (1), $$\frac{\partial X_i(\vec{P})}{P_i}$$

can be calculated. For example, in the case of the robot of FIG. 4A, $$\frac{\partial \vec{X}(\vec{P})}{\partial \vec{P}} \Delta \vec{P} = \begin{pmatrix} \frac{\partial x}{\partial r_1} \Delta r_1 + \frac{\partial x}{\partial r_2} \Delta r_2 + \frac{\partial x}{\partial \theta_1} \Delta \theta_1 + \frac{\partial x}{\partial \theta_2} \Delta \theta_2 \\ \frac{\partial y}{\partial r_1} \Delta r_1 + \frac{\partial y}{\partial r_2} \Delta r_2 + \frac{\partial y}{\partial \theta_1} \Delta \theta_1 + \frac{\partial y}{\partial \theta_2} \Delta \theta_2 \end{pmatrix}$$

$$= \begin{pmatrix} \cos\theta_1 \Delta r_1 + \cos\theta_2 \Delta r_2 - r_1 \sin\theta_1 \Delta\theta_1 - r_2 \sin\theta_2 \Delta\theta_2 \\ \sin\theta_1 \Delta r_1 + \sin\theta_2 \Delta r_2 + r_1 \cos\theta_1 \Delta\theta_1 + r_2 \cos\theta_2 \Delta\theta_2 \end{pmatrix}$$

Now, $\theta_1$ and $\theta_2$ are obtained from $\vec{X}(\vec{P})$, $r_1$ and $r_2$ are constants, and $\Delta r_1$, $\Delta r_2$, $\Delta \theta_1$, and $\Delta \theta_2$ are obtained as the mechanism errors. Therefore, by substituting these values to the equation (8), $$\frac{\partial \vec{X}(\vec{P})}{\partial \vec{P}} \Delta \vec{P}_B = \begin{pmatrix} \delta_x \\ \delta_y \end{pmatrix}$$

Therefore, $$\vec{X}(\vec{P} + \Delta \vec{P} - \Delta \vec{P}_B) \approx \begin{pmatrix} x' \\ y' \end{pmatrix} - \begin{pmatrix} \delta_x \\ \delta_y \end{pmatrix} = \begin{pmatrix} x' - \delta_x \\ y' - \delta_y \end{pmatrix}$$

where, x' and y' denote x' and y' in FIG. 10.

The teaching data $D_B$ obtained in this manner and indicative of the command position for the robot B is stored into the memory 6 or 7 in the same format as that of FIG. 6. This data indicates the command position of the robot B.

The $\vec{Y}(\vec{P})$ are previously calculated in correspondence to all of the $\vec{X}(\vec{P})$ of the robot A and stored in the memory. This procedure is shown in FIG. 11.

Therefore, in the robot B, by playing back at the command position $D_B = \vec{Y}(\vec{P})$, the robot can be positioned to the positioning point $\vec{X}(\vec{P} + \Delta \vec{P})$ of the robot A.

It is also possible to control the robot while calculating the $\vec{Y}(\vec{P})$ upon playback without calculating them at once.

Figure 11:
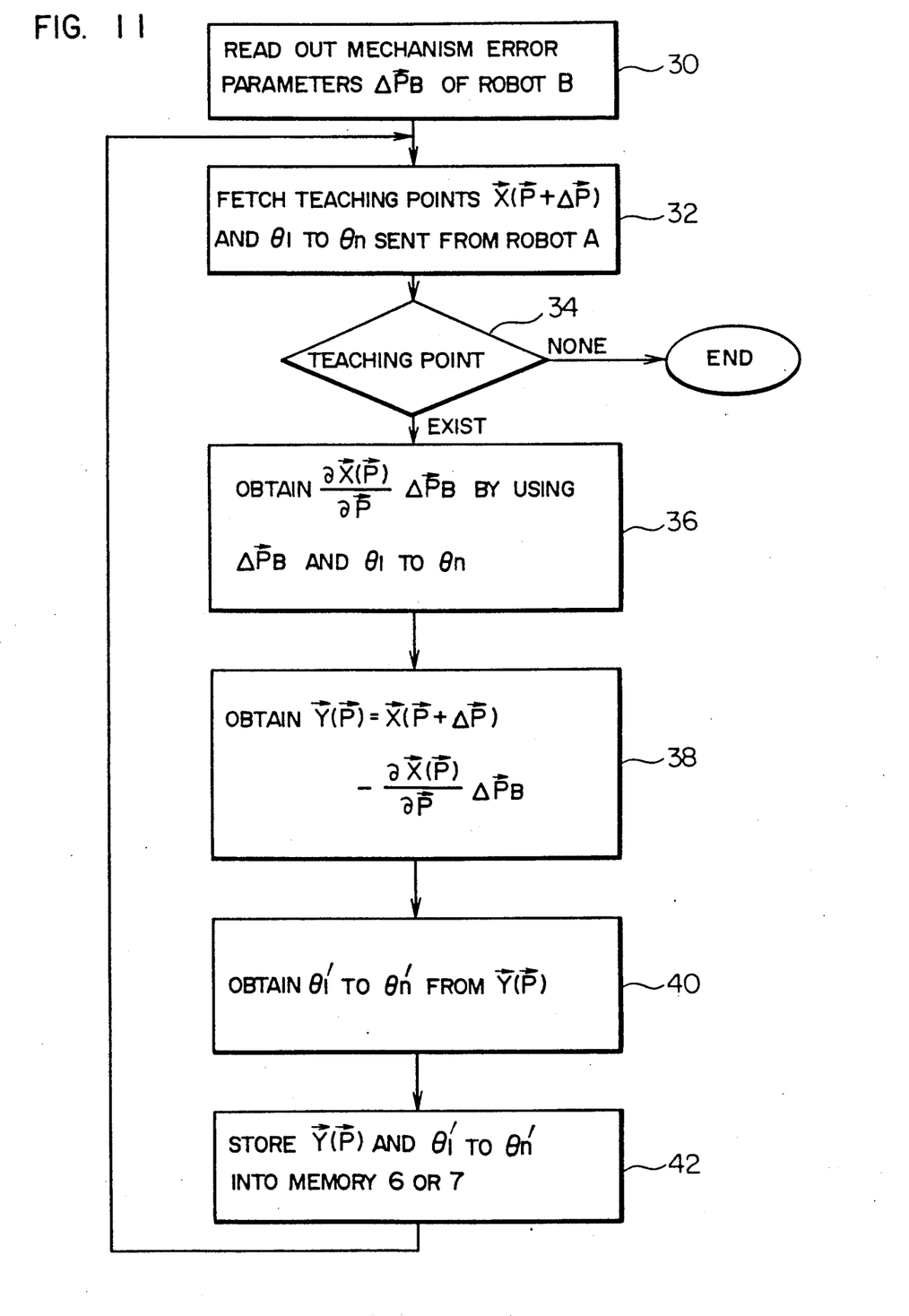
FIG. 11 is a flowchart for explaining the operating steps of previously calculating a command value with respect to a special robot and storing into a memory.

For this purpose, the $\vec{X}(\vec{P}+\Delta\vec{P})$ itself is stored into the memory 6 or 7 in the format of FIG. 6, and each time the point data $\vec{X}(\vec{P}+\Delta\vec{P})$ is read out of the memory, the processes in steps 30 to 42 in FIG. 11 are calculated by using the mechanism errors $\Delta\vec{P}_B$.

On the other hand, the $\vec{X}(\vec{P})$ and $\vec{X}(\vec{P}+\Delta\vec{P})$ can be also stored in place of the teaching data shown in FIG. 6.

Figure 12:
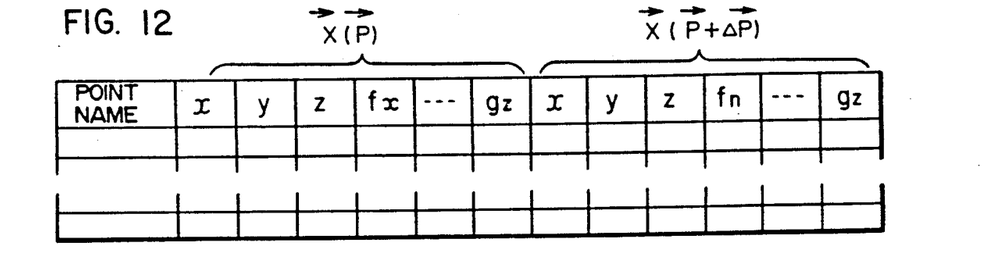
FIG. 12 is a diagram showing a storage format of the command value $\vec{X}(\vec{P})$ and the current position $\vec{X}(\vec{P} + \Delta\vec{P})$.

This example is shown in FIG. 12. In this case, $\theta_1$ to $\theta_n$ in step 32 in FIG. 11 are obtained from the $\vec{X}(\vec{P})$.

Figure 13:
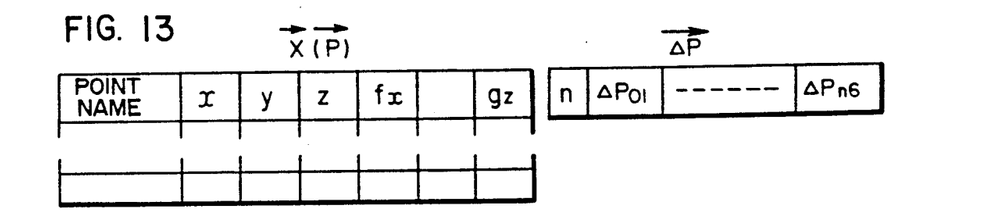
FIG. 13 is a diagram showing a modification of FIG. 12.

In addition, since the $\Delta P$ have already been stored, only the $X(\vec{P})$ can be also stored. This example is shown in FIG. 13.

At this time, $\theta_1$ to $\theta_n$ in step 32 in FIG. 11 are obtained from the $\vec{X}(\vec{P})$ as shown in step 26 in FIG. 9. The $\vec{X}(\vec{P}+\Delta\vec{P})$ in step 32 in FIG. 11 is obtained by using the $\Delta\vec{P}$ by the same method as FIG. 9.

Figure 14:
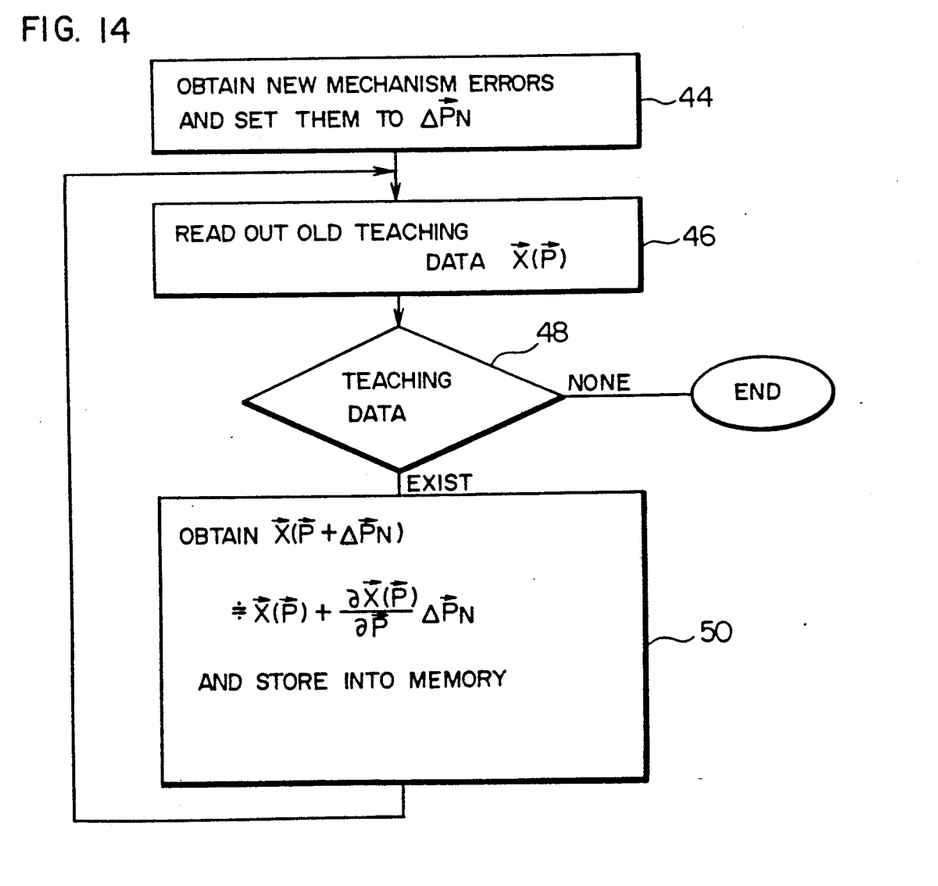
FIG. 14 is a flowchart for explaining a processing procedure when a mechanism parameter changes.

The system of the present invention is not limited to only the mutual use of the teaching data for the other robots but can be also effective even if the mechanism parameters are changed due to some reason (for example, an end-effector was struck or the like). For this purpose, it is sufficient to execute the processes in steps 44 to 50 shown in FIG. 14.

In the present system, it will be obviously understood that the robots A and B are not necessarily the same type when considering the processing system. If the equations to obtain the position and orientation of the robot A and the mechanism parameters $\vec{X}_A(\vec{P}_A)$ of the robot A and the equations to obtain the position and orientation of the robot B and the mechanism parameters $\vec{X}_B(\vec{P}_B)$ of the robot B are known, the invention can be extended by the same method as shown in steps 52 to 62 in FIG. 15.

On the other hand, the precision of the approximate expression can be improved by considering the partial differentiation of second or higher order. The following is the equation when considering until the second order.

$$\vec{X}(\vec{P}+\Delta\vec{P}-\Delta\vec{P}_B) \approx \vec{X}(\vec{P}+\Delta\vec{P}) - \Sigma \frac{\partial \vec{X}(\vec{P}+\Delta\vec{P})}{\partial \vec{P}} \cdot \Delta\vec{P}_B - \Sigma \frac{\partial^2 \vec{X}(\vec{P}+\Delta\vec{P})}{\partial \vec{P}^2} \cdot (\Delta\vec{P}_B)^2$$

The equation of $\vec{X}$ can be calculated without any problem since it is partially differentiable many times.

Although the foregoing embodiment has been described as an example with respect to the robots A and B, the invention can be also similarly applied to three or more robots 1 to n. For instance, it will be understood that arbitrary one of a group of robots is set to the foregoing robot A and the other robots are handled as the robots B, so that desired teaching data can be used commonly for each robot. In this case, an arbitrary robot is not necessarily a standard apparatus of the special specifications. As already mentioned above, the teaching data can be also supplied to the robot using the teaching data in any of the online and offline control manners. Particularly, in the case of the online control, the teaching data is supplied from one robot to the other robots by using communication lines or the like due to the parallel connection, ring-shaped connection, or hierarchy connection and each of the other robots is automatically controlled in accordance with the common teaching data. Thus, the teaching operation of the operator becomes unnecessary.

According to the present invention, teaching data can be mutually used and there is an advantage such that even in the robot itself, even if the mechanism errors change due to some reason, the old teaching data can be used.

We claim:

1. In a system for controlling a plurality of robots, each robot including input/output devices, a servo control section for driving actuators of the robot, a memory, and an arithmetic operating unit coupled with each of said input/output devices, said servo control section, and said memory, a method for generating and commonly applying data to the plurality of robots for executing arithmetic operations of data, said method comprising the steps of:

(a) estimating mechanism errors $\Delta\vec{P}$ which are peculiar to a first robot;
    (b) moving said first robot to a first position by using a teaching pendant and obtaining a current position $\vec{X}(\vec{P})$ of said first robot from status data of each actuator as teaching data, said current position corresponding to a command position produced by said teaching pendant;
    (c) obtaining as data of a desired position $\vec{X}(\vec{P}+\Delta\vec{P})$ from said teaching data indicative of a command position $\vec{X}(\vec{P})$ by using said mechanism errors $\Delta\vec{P}$ decided in the step (a) wherein said data of a desired position are standard position information which represent a position orientation for another robot;
    (d) determining mechanism errors associated with a second robot; and
    (e) arithmetically operating said standard position information and the mechanism errors of said second robot and obtaining corrected command position data $\vec{X}(\vec{P}+\Delta\vec{P}-\Delta\vec{P}_B)$ for said second robot from said desired position data by using mechanism errors $\Delta\vec{P}_B$ of said second robot, thereby enabling the second robot to be controlled on the basis of the teaching data of the first robot.

2. A method according to claim 1, wherein each time said standard position information is supplied from the first robot, the second robot fetches a teaching point included in said information and obtains a command value $\vec{Y}(\vec{P}-\Delta\vec{P}_B)$ of the second robot using said teaching point and said mechanism errors of said second robot.

3. A method according to claim 1, wherein said steps of determining the mechanism errors of the first and second robots each include a step of updating the corresponding robot mechanism errors, obtaining new mechanism errors, and storing the new mechanism errors, and new teaching data are generated using said teaching data and the new mechanism errors and said new teaching data are stored to enable compensation of a change in mechanism parameter when a parameter change occurs.

4. A method according to claim 2, wherein each time the second robot receives the teaching data from the first robot, the second robot again executes said step of determining the mechanism errors thereof and obtains an updated mechanism error parameter and again arithmetically operates the standard position information from the first robot by the updated mechanism error parameter, thereby generating new teaching data.

5. A method according to claim 1, further comprising the steps of:
 fetching teaching points $\vec{X}_A(\vec{P}_A+\Delta\vec{P}_A)$ and $\theta_1$ to $\theta_n$ from the first robot, where $\vec{X}_A(\vec{P}_A)$ denotes a command value which is peculiar to the first robot, $P_A$ and $\Delta\vec{P}_A$ indicate mechanism parameter and mechanism errors respectively, and $\theta_1$ to $\theta_n$ represent articulated angles;
 obtaining articulated angles $\theta_1'$ to $\theta_m'$ of the second robot from said teaching points $\vec{X}_A(\vec{P}_A+\Delta\vec{P}_A)$; and
 calculating a position $\vec{X}_B(\vec{P}_B-\Delta\vec{P}_B)$ to which the second robot is to be actually controlled by the following approximate equation from both of the articulated angles $\theta_1'$ to $\theta_m'$ obtained and the mechanism parameter errors $\Delta\vec{P}_B$ of the second robot $$\vec{X}_B(\vec{P}_B - \Delta\vec{P}_B) = \vec{X}_B(\vec{P}_B) - \frac{\partial \vec{X}_B(\vec{P}_B)}{\partial \vec{P}_B}\Delta\vec{P}_B =$$

$$\vec{X}_A(\vec{P}_A + \Delta\vec{P}_A) - \frac{\partial \vec{X}_B(\vec{P}_B)}{\partial \vec{P}_B}\Delta\vec{P}_B$$

where, $\vec{P}_B$ denotes a mechanism parameter of the second robot.

6. A method according to claim 5, wherein said calculating operation of said position $\vec{X}_B(\vec{P}_B-\Delta\vec{P}_B)$ to which the second robot is to be actually controlled is prepared in advance, in order to reduce the time needed at execution of the second robot, as a command value for the second robot.

7. A method according to claim 5, wherein said calculating operation of said position $\vec{X}_B(\vec{P}_B-\Delta\vec{P}_B)$ to which the second robot is to be actually controlled is executed each time the teaching point of the second robot is supplied from the first robot.

8. A method of controlling a plurality of robots by applying common data to said plurality of robots comprising the steps of:
 determining a mechanism error parameter $\Delta\vec{P}_B$ of a particular robot;
 from another robot, obtaining data of a desired position information $\vec{X}(\vec{P}+\Delta\vec{P})$, indicative of a desired command position corresponding to teaching data $\vec{X}(\vec{P})$ by using mechanism errors P associated with said another robot, said data of a desired position information being standard position information which represents a position orientation for another robot; and
 subtracting said determined mechanism error parameter $\Delta\vec{P}_B$ from said standard position information to obtain a data $\vec{X}(\vec{P}+\Delta\vec{P}-\Delta\vec{P}_B)$ as peculiar teaching data of said particular robot; and
 moving said particular robot to a desired position of said another robot in accordance with said peculiar teaching data.

9. A method according to claim 8, wherein said peculiar teaching data of the particular robot which is obtained by said subtracting step is stored in a memory of said particular robot.

10. A method according to claim 8, wherein said subtracting step includes:
 fetching positioning points $\vec{X}(\vec{P}+\Delta\vec{P})$ and $\theta_1$ to $\theta_n$, where $\vec{X}$ denotes a command value to said another robot, $\vec{P}$ and $\Delta\vec{P}$ indicate mechanism parameters and mechanism errors, and $\theta_a$ to $\theta_n$, represent artic-ulated angles, from the standard position information supplied from said another robot;
 obtaining $$\frac{\partial \vec{X}(\vec{P})}{\partial \vec{P}} \cdot \Delta\vec{P}_B$$

by using both of the mechanism errors $\Delta\vec{P}_B$ of said particular robot and the $\theta_1$ to $\theta_n$;
 obtaining the command value $$\vec{Y}(\vec{P}) = \vec{X}(\vec{P}+\Delta\vec{P}) - \frac{\partial \vec{X}(\vec{P})}{\partial \vec{P}} \cdot \Delta\vec{P}_B$$

of said particular robot by substituting said obtained value of $$\frac{\partial \vec{X}(\vec{P})}{\partial \vec{P}} \cdot \Delta\vec{P}_B$$

for the second term of the equation for $\vec{Y}(\vec{P})$
and
 calculating the articulated angles $\theta_1'$ to $\theta_n'$ of said particular robot from the command value $\vec{Y}(\vec{P})$ derived.

11. A method according to claim 10, wherein said command value $\vec{Y}(\vec{P})$ and articulated angles $\theta_1'$ to $\theta_n'$ calculated are stored in a memory in said particular robot.

12. An apparatus for controlling robots in accordance with peculiar teaching data to the robots comprising:
 first means for determining a mechanism error parameter $\Delta\vec{P}_B$ of a particular robot;
 second means for obtaining in another robot data of a desired position $\vec{X}(\vec{P}+\Delta\vec{P})$ from teaching data by using the mechanism error parameters of said another robot, said desired position data indicating a position and an orientation of said another robot to be actually positioned and the teaching data indicating a desired command position; and
 third means, connected to said first and second means, for subtracting the determined mechanism error parameter in the first means from said desired position data and obtaining said peculiar teaching data of said particular robot as the result of the substraction;
 fourth means, connected to said third means, for positioning said particular robot at the desired command position of said particular robot in accordance with said peculiar teaching data.

13. An apparatus according to claim 12, wherein said particular robot includes:
 a memory storing said desired position data from said another robot so that said desired position data can be updated said memory also storing the mechanism error parameters from said first means; and
 a central processing unit for executing predetermined procedures to move said particular robot to obtain all of said peculiar teaching data of said particular robot from both said stored desired position data and said stored mechanism error parameters and then storing said peculiar teaching data in said memory so as to be able to read out when said particular robot is to be moved to points corresponding to said peculiar teaching data.

* * * * *

UNITED STATES PATENT AND TRADEMARK OFFICE
CERTIFICATE OF CORRECTION

Page 1 of 2

PATENT NO.   : 5,021,970
DATED        : June 4, 1991
INVENTOR(S)  : Shunji Mohri, et. al.

It is certified that error appears in the above-identified patent and that said Letters Patent is hereby corrected as shown below:

| Column | Line | |
|---|---|---|
| ABS. | 8 | Change "is" to --are--. |
| 2 | 25 | Change "$(r_1, r_2, \theta_1, \theta_1)$" to --$(r_1, r_2, \theta_1, \theta_2)$--. |
| 2 | 44 | Change "Manipurators:" to --Manipulators:--. |
| 2 | 67 | Change "presuming" to --anticipating--. |
| 3 | 6 | Change "X(P). X" to --$\vec{X}(\vec{P})$. $\vec{X}$--. |
| 4 | 28 | After "value" change "X(P)" to --$\vec{X}(\vec{P})$--. |
| 7 | 5 | Change "$T_B = \vec{Y}(\vec{P} + \Delta \vec{P}_B)$" to --$T_B = \vec{Y}(\vec{P} + \Delta \vec{P}_B)$--. |
| 7 | 13 | Change "Y(P)" to --$\vec{Y}(\vec{P})$--. |
| 7 | 55 | Change "$\vec{X}(\vec{P}) + \Delta \vec{P}) \approx \vec{X}(P) + \frac{\partial \vec{X}(P)}{\partial \vec{P}} \Delta \vec{P}$" to --$\vec{X}(\vec{P}) + \Delta \vec{P}) \approx \vec{X}(\vec{P}) + \frac{\partial \vec{X}(\vec{P})}{\partial \vec{P}} \Delta \vec{P}$--. |
| 8 | 7 | Change "further" to --also--. |
| 8 | 32 | Change "$\partial P$" to --$\partial \vec{P}$--. |
| 9 | 14 | Change "$\Delta P$" to --$\Delta \vec{P}$--. |

UNITED STATES PATENT AND TRADEMARK OFFICE
CERTIFICATE OF CORRECTION

PATENT NO. : 5,021,970

DATED : June 4, 1991

INVENTOR(S) : Shunji Mohri, et. al.

It is certified that error appears in the above-identified patent and that said Letters Patent is hereby corrected as shown below:

| Column | Line | |
|---|---|---|
| 9 | 15 | Change "$X(\vec{P})$" to --$\vec{X}(\vec{P})$--. |
| 9 | 65 | Change "due to" to --consisting of--. |
| 11 | 6 | Change "parameter" to --parameters--. |
| 12 | 55 | After "updated" insert --,--. |

Signed and Sealed this

Twenty-second Day of June, 1993

Attest:

MICHAEL K. KIRK

Attesting Officer     Acting Commissioner of Patents and Trademarks